US008485551B2

(12) United States Patent
Dainese et al.

(10) Patent No.: US 8,485,551 B2
(45) Date of Patent: Jul. 16, 2013

(54) COVERING ASSEMBLY FOR A SEAT AND SEAT ADAPTED FOR PROTECTING A USER

(75) Inventors: Lino Dainese, Molvena (IT); Luigi Ronco, Molvena (IT)

(73) Assignee: Dainese S.p.A., Molvena (IT)

( * ) Notice: Subject to any disclaimer, the term of this patent is extended or adjusted under 35 U.S.C. 154(b) by 0 days.

(21) Appl. No.: 13/583,607

(22) PCT Filed: Mar. 3, 2011

(86) PCT No.: PCT/IB2011/050906
§ 371 (c)(1),
(2), (4) Date: Nov. 19, 2012

(87) PCT Pub. No.: WO2011/110982
PCT Pub. Date: Sep. 15, 2011

(65) Prior Publication Data
US 2013/0093224 A1    Apr. 18, 2013

(30) Foreign Application Priority Data
Mar. 9, 2010    (IT) .............................. VR2010A0042

(51) Int. Cl.
*B60R 21/207*    (2006.01)
(52) U.S. Cl.
USPC ................ 280/730.2; 297/216.13; 280/730.1
(58) Field of Classification Search
USPC ............. 280/730.1, 730.2, 743.2; 297/216.1, 297/216.13, 284.6
See application file for complete search history.

(56) References Cited

U.S. PATENT DOCUMENTS

| 5,902,010 | A | 5/1999 | Cuevas | |
|---|---|---|---|---|
| 7,549,672 | B2 * | 6/2009 | Sato et al. | 280/730.2 |
| 7,600,777 | B2 * | 10/2009 | Suzuki et al. | 280/730.2 |
| 8,047,564 | B2 * | 11/2011 | Kibat et al. | 280/730.2 |
| 2005/0236819 | A1 * | 10/2005 | Riedel et al. | 280/730.2 |
| 2009/0020988 | A1 | 1/2009 | Sato et al. | |
| 2010/0295282 | A1 * | 11/2010 | Kim et al. | 280/730.2 |

FOREIGN PATENT DOCUMENTS

| DE | 43 34 896 A1 | 4/1995 |
|---|---|---|
| DE | 199 38 532 A1 | 2/2001 |
| DE | 199 50 702 A1 | 4/2001 |
| DE | 10 2007 045550 A1 | 4/2009 |
| JP | 9 295549 A | 11/1997 |

OTHER PUBLICATIONS

PCT Search Report of International Application PCT/IB2011/050906 filed on Mar. 3, 2011 in the name of Dainese S.P.A. Mail Date: Jul. 14, 2011.
PCT Written Opinion of International Application PCT/IB2011/050906 filed on Mar. 3, 2011 in the name of Dainese S.P.A. Mail Date: Jul. 14, 2011.
PCT IPRP with Annexes of International Application PCT/IB2011/050906 filed on Mar. 3, 2011 in the name of Dainese S.P.A. Mail Date: May 9, 2012.

* cited by examiner

*Primary Examiner* — Ruth Ilan
*Assistant Examiner* — Darlene P Condra
(74) *Attorney, Agent, or Firm* — Steinfl & Bruno LLP

(57) ABSTRACT

A covering assembly for a seat, including a cover adapted to cover a support frame of the seat and an inflatable member adapted to assume a resting deflated condition and an active inflated condition is described. The inflatable member is located on a side of the cover intended to be faced towards the support frame. The cover is adapted to contain the inflatable member both in the deflated condition and in the inflated condition.

18 Claims, 10 Drawing Sheets

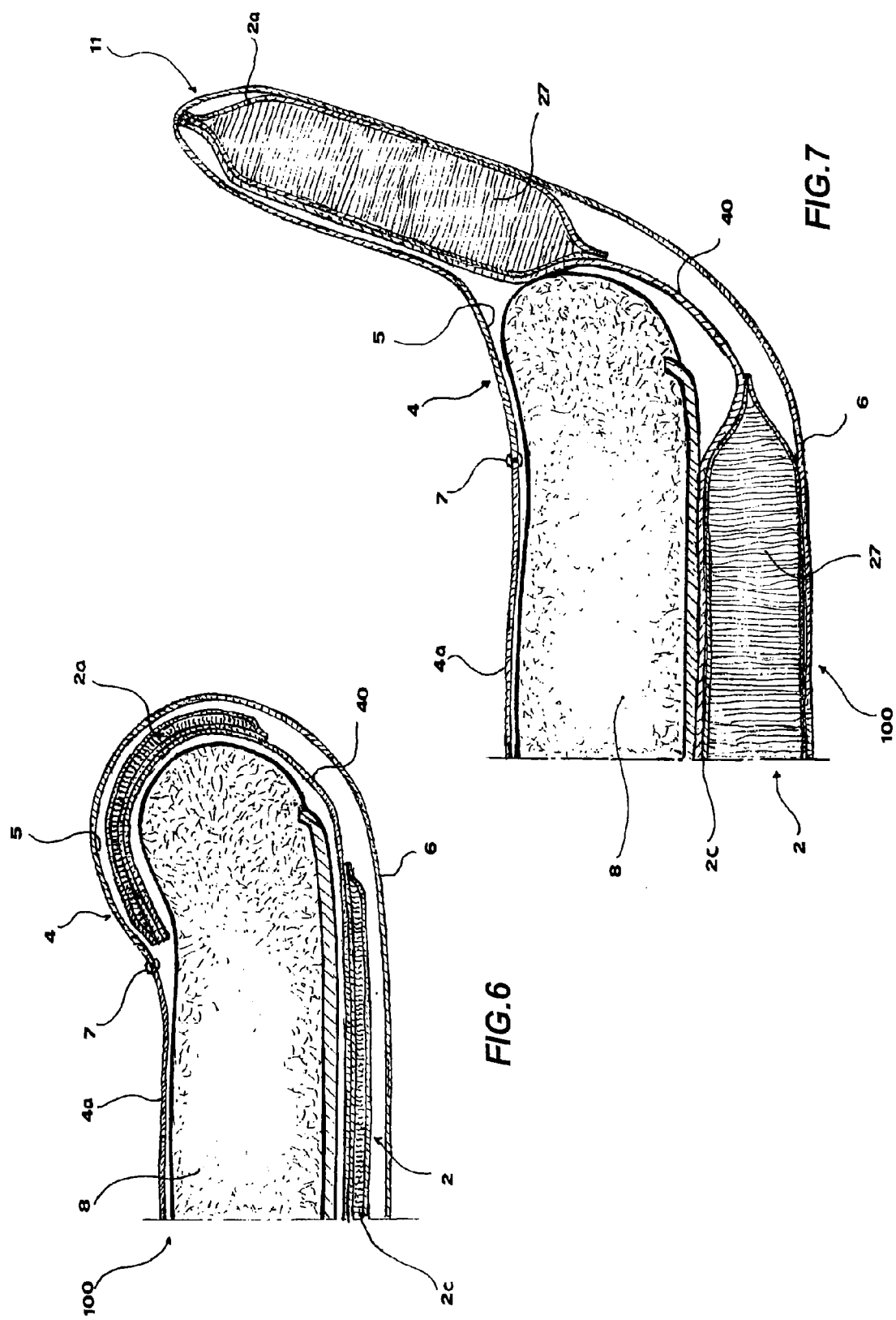

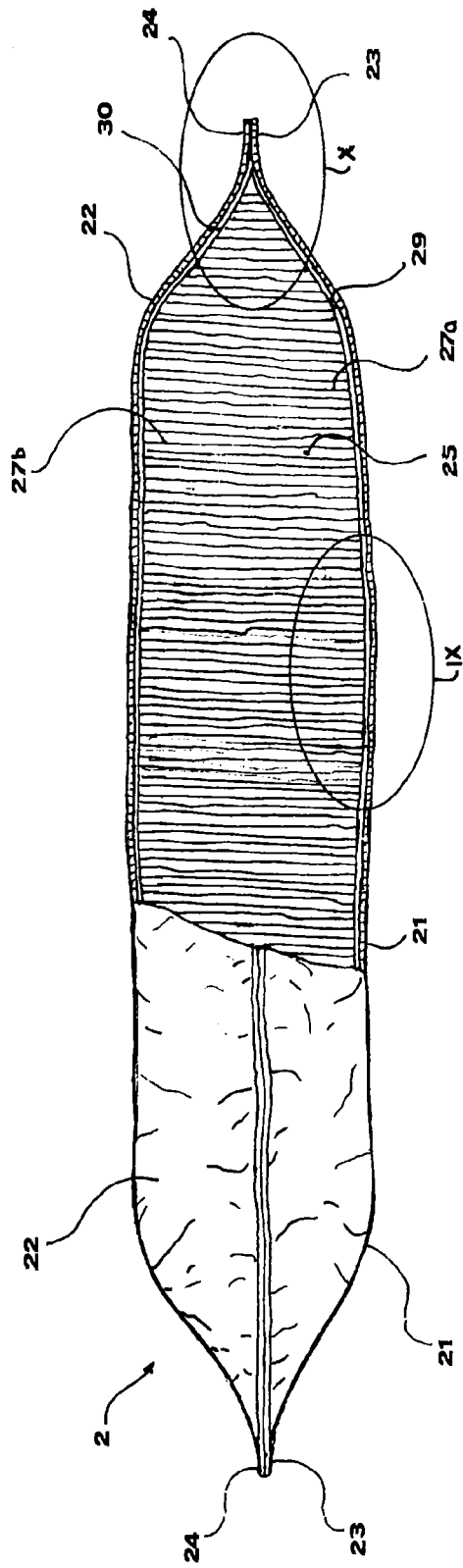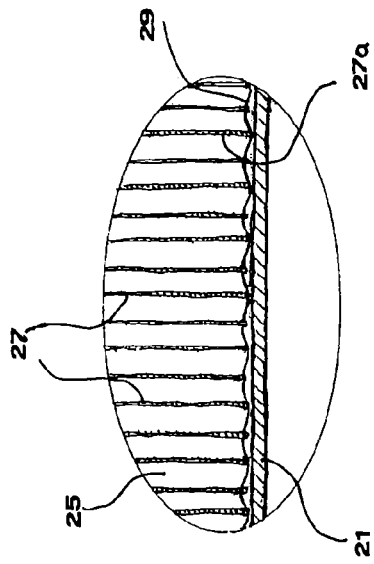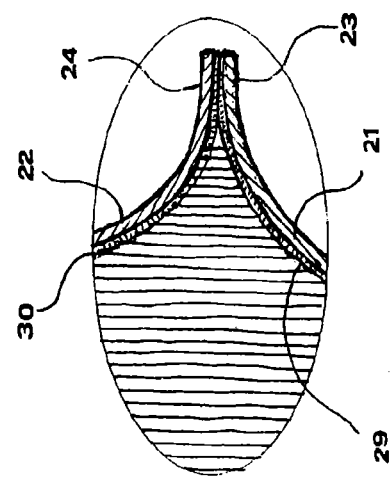
FIG.8
FIG.9
FIG.10

COVERING ASSEMBLY FOR A SEAT AND SEAT ADAPTED FOR PROTECTING A USER

CROSS REFERENCE TO RELATED APPLICATIONS

The present application is the US national stage of International Application PCT/IB2011/050906 filed on Mar. 3, 2011, which claims priority to Italian Patent Application VR2010A000042 filed on Mar. 9, 2010, which is incorporated herein by reference in its entirety.

The present disclosure refers to a covering assembly for a seat, and to a seat properly structured and conformed to protect a passenger, a driver of a vehicle or a similar user, from multiple primary and secondary impacts, during a trip with a vehicle.

The seat is preferably a motor vehicle seat.

The present disclosure also refers to a vehicle including a seat according to the present disclosure.

In the last years, as a result of constant research in safety for driving, for example for a normal everyday use of the car, or for sporting activities, but more generally to activities carried out using a vehicle and potentially dangerous exposed to potential impacts, it was conceived to associate protection devices to a seat or to other seatings (e.g. child seats) on which a user of a vehicle sits, to protect the user in case of an impact, and to keep the user as much as possible firmly seated on the seat.

In other words, there is the need to keep a passenger on the seat in case of impact. To try to meet this need, a way to proceed is associating an inflatable member, as a bag made of air tight material, to a portion of seat in the region of body parts of a user that, when the latter is sitting on the seat, are potentially concerned by impacts. In practice, the inflatable member is placed deflated and folded in a closed housing of that portion of the seat.

Moreover, at the moment of a vehicle's impact, the inflatable member is placed in fluid communication with a compressed gas source, as a gas canister.

Generally the gas source is apt to introduce a predefined quantity of compressed gas into the inflatable member such as to produce the inflated, and therefore, tensioned condition of the inflatable member, forming a round-shaped inflated casing, for example balloon-like, or a cylindrical-shaped casing.

In particular, the inflatable member in an inflated condition projects from the casing of the seat through a suitably provided opening or an openable flap.

The seats according to the prior art appear, however, to be not sufficiently effective in terms of protection of the user in case of impact or accident, which is able to determine an excessively rapid inflation of the inflatable member. In particular, it has been observed a difficulty in controlling the position of the inflatable member in an inflated condition. In fact, as a result of the rapid inflation, it is difficult to direct the unfolding of the inflatable member a priori, and therefore it is difficult to ensure user protection against impacts.

The positioning of the inflated member is not entirely predictable and therefore, wrongly positioned, it may not adequately protect the user.

Therefore, in case of impact, it is not possible to keep a passenger on the seat to avoid the passenger, coming out from the outline of the seat, impacting other passengers or rigid parts of the bodywork or the interior upholstery of the car or other rigid parts.

The technical problem underlying the present disclosure is that of providing a covering assembly for a seat and a seat which are able to overcome the abovementioned drawbacks and/or of achieving further advantages.

This problem is solved by a covering assembly for a seat, as defined in independent claim 1, by a seat as defined in claim 14 and by a vehicle as defined in claim 19.

Thanks to a covering assembly for a seat according to the present disclosure, and by the seat including that assembly, it is possible to obtain a controlled deformation of the seat in the event of the inflation of the inflatable member, preventing the complete or partial exit of the inflatable member from the cover.

Secondary aspects of the subject of the present disclosure are defined in the corresponding dependent claims.

In these claims, and in the entire present disclosure, by the expression "covering assembly for a seat" it is meant a set of members intended to be associated with a support frame or load-bearing framework of a seat, and more particularly to cover the support frame of a seat in order to achieve, together with the support frame, a suitable seating for a user.

By the expression "seat" it is meant an article intended to provide a seating for a user, wherein that seat, thanks to the presence of an inflatable member, can provide effective protection in case of impact or accident.

The seat according to the present disclosure may be a seat for vehicles (such as cars, planes, helicopters and similar vehicles), as a driver's seat or passenger's seat (front or rear), or a baby's seat.

Alternatively, the seat according to the present disclosure may be used on board of a vehicle, such as a vehicle for use in sports, which may be subject to impact or accident.

The subject of the present disclosure provides some significant advantages.

The main advantage of the covering assembly for seat according to the present disclosure, and of the seat including that assembly, lies in that the inflatable member is retained on the internal side of the cover and in particular below the cover and is therefore intended to be placed inside the seat. After a potential activation and inflation, the inflatable member remains below the cover, and, in that location under the cover, the position of the inflatable member is a priori more controlled in the inflated condition, thanks to a retention determined itself by the presence of the cover that covers and contains it.

Another advantage lies in that, de facto, the seat deforms when the inflation of the inflatable member occurs, thus avoiding an abrupt and sudden release of an inflatable member, that may cause fear for a user, or even impacts injuries against the inflatable member.

In one embodiment, the seat is provided with a backrest and an inflatable member located in the region of the sides of the backrest. When the inflatable member is in an inflated condition, the seat deforms so as to show protuberances or lateral barriers projecting towards a frontal/front direction of the backrest. In practice, a user, seating on the seat, is laterally retained by the lateral barriers (projecting towards the front region of the seat) and so he is prevented from a lateral movement with respect to the seat.

Preferably this lateral barriers extend forward up to laterally protect also the legs of a user.

Alternatively, the covering assembly includes protection barriers, independent from said lateral barriers, and that are placed in the region of the sides of the seating of a seat.

Preferably, to prevent a wrong movement of the head, the seat includes an headrest and said lateral barriers extend in height also at the sides of the headrest. In one embodiment, the cover is of a plastic material or includes an elastic insert.

The main advantage of this last embodiment is that the portion of the cover, affected by inflation, may adapt to the inflation of the inflatable member, as well as is capable to promote the return of the inflatable member in a deflated condition; this is possible thanks to the intrinsic properties of the elastic material which, once deformed by a strain action (in this case given by the inflation of the inflatable member), returns to the starting configuration or deformation as the strain action terminates.

In fact, when the inflatable member returns in a deflated condition, the elastic portion of the cover returns to an undeformed, or only partially deformed condition, and brings back the cover to the initial extent.

Therefore, the elastic insert or the elastic material permits to the portion of the cover affected by the inflation to adapt to the change of volume of the inflatable member. Furthermore, an appropriate choice of a preferred direction of elastic stretching (according to the properties of elastic isotropy or anisotropy of the material), and, in case of using an elastic insert, of the location of such an elastic insert, may further contribute to control/direct the position and the unfolding of the inflatable member to an inflated condition.

Another advantage of the presence of the elastic insert lies generally in a better "fit" and adherence of the cover to the support frame of the seat, without substantially being affected by the presence of an inflatable member beneath the cover.

In one further embodiment, the cover includes a bellows-shaped portion, and therefore it is extensible in case of inflation to adapt to the change of volume of the inflatable member.

That bellows-shaped portion, or other opening system or superficial extension, can be provided with seams using calibrated-break threads, that break in case of inflation.

In one embodiment, it is possible to have the inflatable member permanently below the cover without removal or replacement of the inflatable member for a new use, after an initial activation and inflation. Eventually the inflatable member is connected to a new source of compressed gas.

In particular, in this embodiment, after the impact/inflation, it is sufficient to carry out a complete deflation of the inflatable member and a new connection with means for inflating, such as a source of compressed gas, to restore the protection. Therefore it is possible to simplify and speed up the recovery process of the inflatable member for a new use, for example when an accidental activation has occurred or the vehicle has reported minor damages and can be repaired.

In one embodiment, in order to hold the inflatable member below the cover at the time of inflation, it is advantageous to provide means to optimally control the expansion of the inflatable member. For example, it was found that a suitable form of the inflatable member for a placement below the cover is a substantially flattened, mat-like form.

In particular, in one embodiment, to control the shape of the inflatable member, the inflatable member includes a plurality of tie members, preferably thread-like and inextensible tie members, placed inside the inflatable member and stably associated with opposed superficial portions of the inflatable member itself.

In the present disclosure, by the term "tie member" it is meant a member or entity having the function of keeping joined or constrained or stationary two or more parts of the inflatable member, at least when the latter is in an inflated condition, said tie member being tensioned by tensile stress when the inflatable member is in an inflated condition.

By suitably calibrating the maximum length of the tie members in stretched or tensioned condition, it is possible to control the shape of the inflatable member in an inflated condition a priori. For example, with all tie members having the same length, it is possible to create a flattened mat-like form inflatable member.

In one embodiment, the inflatable member includes a first wall and a second wall associated therebetween along respective perimetral edges so as to define an internal chamber, a first mesh that is at least partially internally glued to said first wall, and a second mesh that is at least partially internally glued to said second wall. The tie members have respective opposite ends fixed or fastened to the first mesh and to the second mesh.

The use of walls joined along the perimeter and of tie members connected to the meshes, which internally line these walls, provides an inflatable member with a reduced number of seams (which may eventually determine an insufficient gas tightness) and therefore allows to maintain the inflatable member in an inflated condition for a long time, and so to keep a passenger within the outline of seat.

Further advantages, characteristic features and the modes of use of the subject of the present disclosure will become clear from the following detailed description of some preferred embodiments thereof, provided solely by way of a non-limiting example.

It is clear, however, that each embodiment may have one or more of the advantages listed above; in any case it is not required that each embodiment should have simultaneously all the advantages listed.

Reference shall be made to the figures in the accompanying drawings wherein:

FIG. 6 shows a schematic sectional view, along the line VI-VI of the covering assembly for a seat of FIG. 1;

FIG. 7 shows a schematic sectional view, along the line VII-VII of the covering assembly for a seat of FIG. 2;

FIG. 8 shows a schematic sectional view, along the line VIII-VIII of the inflatable member of FIG. 4;

FIG. 9 shows a detail IX of FIG. 8, in an enlarged scale;

FIG. 10 shows a detail X of FIG. 8, in an enlarged scale;

Figures 1, 2:
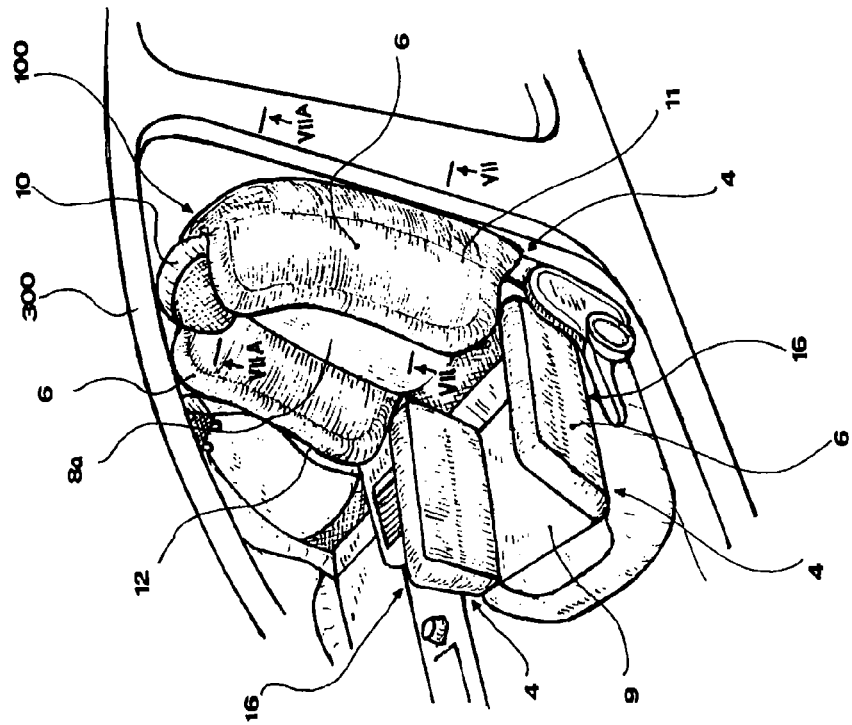
FIG. 1 shows a perspective view of a covering assembly for a seat of the present disclosure in a deflated condition.
FIG. 2 shows a perspective view of a covering assembly for a seat of the present disclosure in an inflated condition.
Figure 3:
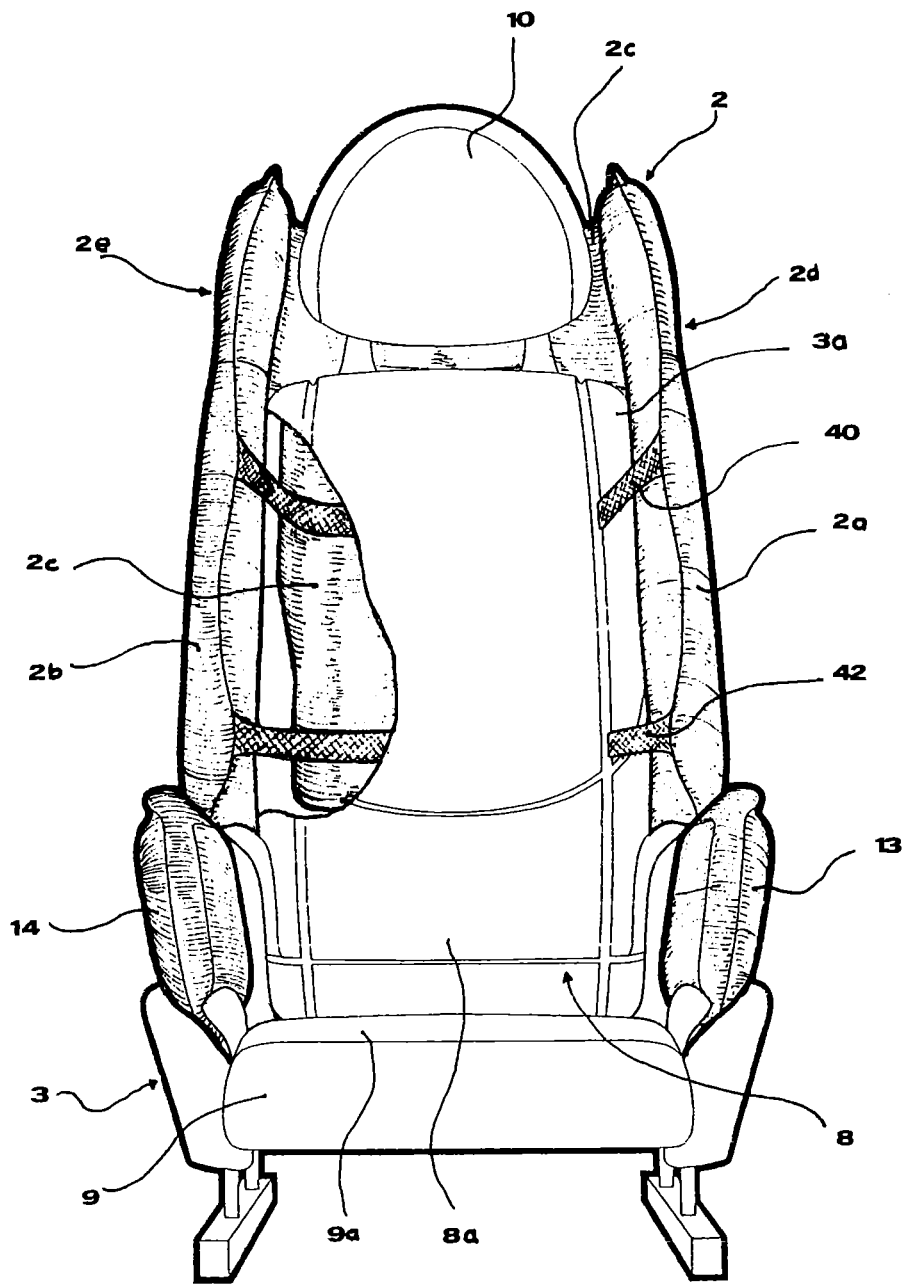
FIG. 3 shows a front view of an inflatable member associated, in an inflated condition, to a frame of a seat of the present disclosure.

Referring to the annexed FIGS. 1 to 10, by reference number 100 a covering assembly for a seat 1 according to the present disclosure is indicated, in the example a driver's seat 1 of a vehicle 300, in the example a car, of which only a portion of the bodywork is illustrated. The seat 1 includes a support frame 3.

The term support frame 3 refers to an interior construction of a seat, for example a load-bearing framework, pads, springs and the like, which allows to a user a comfortable seating for a user, wherein such interior construction is of a conventional type and is not further described. In the example shown, the seat 1 comprises a backrest 8, a seating 9, and a headrest 10.

The covering assembly 100 includes a cover 4 that lines or covers the support frame 3 and an inflatable member, in the example three inflatable members 2, 13, 14, located in corresponding zones of the seat 1 intended to provide protection to a passenger, as will be described below.

Each inflatable member 2, 13, 14 is adapted to be inflated by introducing an inflation fluid, for example a cold gas, like Helium. In the example it's used a canister 60 internally connected to the inflatable member 2, 13, 14.

In particular, each inflatable member 2, 13, 14 is adapted to assume a deflated resting condition and an active inflated condition. The inflation modes and the structure of the inflatable member 2 will be described hereinafter in the description.

As it can be observed from the figures, the cover 4 contains each inflatable member 2, 13, 14 both in the deflated condition, and in the inflated condition. In other words, in both deflated and inflated states, each inflatable member 2, 13, 14 is located on a side 5 (FIGS. 6, 7, 7a) of the cover 4 intended for being faced towards the support frame 3, therefore it is intended for being interposed between the cover 4 and the support frame 3 to be hidden from view.

Even more particularly, in the example, each inflatable member 2, 13, 14 is located hidden to view, in contact with the side or internal face 5 of a portion of cover 4 in the region of said zones concerned to protection. Therefore, said portion of the cover 4, in the region of the inflatable member 2, 13, 14, is a complete covering for the inflatable member 2, 13, 14, to completely cover/close the latter.

It follows that each inflatable member 2, 13, 14 is permanently hidden to view and does not come out, basically, from the seat 1, causing a deformation of the outline of the seat 1 during the inflation of the inflatable member 2, 13, 14. Again, in other words, the inflatable member 2, 13, 14 in contained (and enclosed) by the cover 4 both in the deflated condition and in the inflated condition, the expansion of the inflatable member 2, 13, 14 being allowed by the deformation of the seat 1.

In particular, the inflation/deflation of the seat 1 is visible in FIG. 2, FIGS. 3 to 5 and partially FIG. 7.

More in particular, in the example shown in FIGS. 1 to 5, the covering assembly 100 includes an inflatable member 2 including lateral portions 2a, 2b or wings that are located in respective lateral zones or sides of the backrest 8 of the seat 1, and a rear portion or appendage 2c that is to be disposed mantle-like in a respective rear zone of the seat 1, in particular of the backrest 8. The rear portion 2c is interposed and connected to the lateral portions 2a, 2b in the region of respective top portions 2d, 2e located in the region of an upper zone or top portion 3a of the support frame 3 of the seat 1.

Moreover, the lateral portions 2a, 2b are bent forward in the upper zone of the seat 1.

In practice, in the example shown here, the inflatable member 2 is located so as to surround or embrace the support frame 3 and it is shaped so that, once inflated, it causes a deformation of the seat 1 to define two side barriers 11 and 12 (FIG. 2, FIG. 7, FIG. 7a) projecting like protuberances on the sides of the backrest 8 to laterally contain any possible sudden movement of a user, and at the same time, on the rear side of the backrest 8 to protect a passenger seating on a rear seat of the car 300.

It should be noted that the lateral barriers 11 and 12 extend as far as to be at the level of the headrest 10, so as to laterally contain also the head of a user.

In FIGS. 6 and 7 it is sectionally and schematically shown and—for better comprehension—with slightly detached parts, a side of the backrest 8 affected by the inflation, which shows the inflatable member 2 bent forward and, in an inflated condition, projecting forward to define the side barrier 11 or 12.

The inflatable member 2 is also provided with two tapes 40, 42, an upper and a lower tape (FIGS. 3 and 7), each acting as a traction member, which are located behind the support frame 3 in the region of the backrest 8 and connect the lateral portions 2a, 2b of the inflatable member 2 at two different levels, and allow to maintain the two lateral portions 2a, 2b, in the inflated condition, substantially aligned and parallel to the sides of the backrest 8 and avoid any possible undue lateral enlargement of the lateral portions 2a, 2b themselves.

In order to keep the inflatable member 2 in a stable and fixed position below the cover 4, the inflatable member 2 is provided with eye-bolts 45 placed along the periphery of the inflatable member 2 and intended to be connected through laces (not shown) to the support frame 3.

Moreover, the inflatable member 2 is at least partially fixed to the cover 4, eventually through said eye-bolts 45/laces.

The covering assembly 100 includes an inflatable member 13 and an inflatable member 14, intended to be placed at the sides of the seating 9. The inflatable member 13 and the inflatable member 14 have a substantially rectangular-like form and are fixed below the cover 4, and they are structurally independent with respect to the inflatable member 2.

In an inflated condition the inflatable members 13 and 14 create additional protection barriers 15, 16 respectively (FIG. 2) for the legs of a user.

It should be noted that the cover 4 intended to cover the inflatable member 2 or the cover 4 intended to cover the inflatable member 13 or 14 may be one piece, or structurally independent single pieces.

It should be pointed out that, by way of the seat 1 and the covering assembly 100, a passenger may be held on the seat in case of impact, avoiding him to get out from the outline of the seat and hit other passengers or rigid parts of the bodywork or of the interior upholstery of the vehicle 300.

Moreover, in order to adapt the cover 4 to the inflation of the inflatable member 2, 13, 14, the portion of the cover 4 preferably includes an elastic insert 6 that extends in the region of the inflatable member 2, up to cover the entire rear side of the backrest 8, and in the region of the inflatable members 13 and 14. The elastic insert 6 is preferably made of an elastic layer, e.g. nylon combined with an elastomer.

Even more particularly, the elastic insert 6 is fixed through seams 7 to a portion of the cover 4 not affected by the inflation, and in particular to the zone 4a in the region of the front or frontal side 8a, of the backrest 8, as visible in FIGS. 6 and 7, and in an upper zone 9a of the seating 9. Therefore, the elastic insert 6 take up lateral and rear zones of the backrest 8 and lateral zones of the seating 9.

In substance, in this embodiment of the seat 1, when each inflatable member 2, 13, 14 is inflated, the portion of cover 4 is deformed by the expansion force of the inflatable member 2, 13, 14 up to create the lateral barriers 11 and 12 and the rear protection of the backrest 8, and the protection barriers 15, 16 of the seating 9.

The elastic insert 6 allows the seat 1 to adapt to a variation in the volume of each inflatable member 2, 13, 14.

When each inflatable member 2, 13, 14 is deflated, the elastic insert 6 returns in an undeformed condition thanks to its elastic properties, and brings along the associated portion of the cover 4 so as to promote, at least partially, a compression and a deflation of the respective inflatable member 2, 13, 14.

Another advantage given by the presence of the insert 6 made of an elastic material lies in the fact of promoting a better adherence of the portion of the cover 4 to the support frame 3.

It should be pointed out that, in an inflated condition, the lateral portions 2a, 2b of the inflatable member 2, the rear portion 2c and the inflatable members 13, 14 have a flattened mat-like shape to define said lateral barriers 11, 13 and protection barriers 15, 16; this flattened shape allows to obtain the required lateral containment of a user sitting on seat 1 and it is also suitable for positioning the inflatable member 2, 13, 14 below the cover 4.

In fact, thanks to this shape, the inflatable member 2, 13, 14 requires a reduced and previously determined expansion volume, and it can remain inside the cover 4 also in an inflated condition.

In particular, referring to FIGS. 8 to 10, the structure of the inflatable member 2, 13, 14 is described. For the sake of conciseness, the structure is described only referring to the inflatable member 2, it being understood that also the inflatable members 13 and 14 include the same structure.

The inflatable member 2 includes two walls 21, 22 placed spaced apart from each other to define an internal chamber 25; in the example, the material of the two walls is gas-tight to the inflation gas. In particular the walls 21, 22 are connected along the perimeter, in the example sealingly fixed.

The inflatable member 2 includes also a first mesh 29 and a second mesh 30 which are opposed the one with respect to the other and connected through a plurality of tie members 27.

The two walls 21, 22 define a case including, in a sandwich-like way, the structure formed by the two meshes 29, 30. In particular, each mesh 29, 30 internally lines a respective wall 21, 22, and it is thereto glue-fixed.

In substance, the inflatable member 2 includes a prefab textile structure, or body, including the two meshes 29, 30, and the two walls 21, 22, or layers, in the example gas-tight; a first wall 21 is glued to a first mesh 29 and a second wall 22 is glued to a second mesh 30.

The tie members 27 have opposite ends 27a, 27b stably fixed to the respective mesh 29, 30. The fixing in the region of the opposite ends 27a, 27b of the tie members 27 is, e.g. obtained by a mere weaving of the tie members 27 between the wefts of the respective mesh 29, 30.

Alternatively, each tie member 27 is a thread integrally interlaced with, or continuously evolving from, both said first and second mesh 29, 30. In practice, the thread/tie member 27 comes out from one of said first and second mesh 29, 30 and is integrally interlaced with the other one of said first and second mesh 29, 30.

The two meshes 29, 30 and the tie members 27 form a so-called 3D (three-dimensional) or double-knit fabric.

The meshes 29 and 30 are made of polyester or polyamide.

The two walls 21, 22, or layers, are made of a layer of soft and gas-tight material, e.g. polyamide or polyurethane; the two walls 21, 22 are opposed the one with respect to the other, and perimetrically fixed along the abovementioned perimetral edges 23, 24.

In the example, the tie members 27 have the shape of threads, and are made e.g. of polyester or polyamide, of a thickness comprised between about 500 and about 1000 decitex (Unit of length of a continuous thread or of a yarn). Even more particularly, each thread 27 includes a bundle of continuous torsion-free fibers coming out from a single point of a respective mesh 29, 30.

The tie members 27 are suitably sized so that, when the inflatable member 2 is in a resting condition, they are preferably not subjected to tensioning and are collapsed in the internal chamber 25, whereas, when the inflatable member 2 in an inflated condition, they are subjected to tensile stress, as illustrated by way of example in FIGS. 7 to 10.

The tie members 27 are preferably distributed in a thickly and homogeneous way in the inflatable member 2, e.g. with a density of at least one tie member per each $cm^2$ of surface of the inflatable member 2, even more preferably, always by way of example, with a density comprised between 1 and 15 wires per each $cm^2$ of surface of the inflatable member 2, preferably between 4 and 6 wires per each $cm^2$.

From the description shown above, it can be pointed out that the tie members 27 allow to control the flattened shape of the inflatable member 2 in an inflated condition, and allow, in general, to control the shape of the inflatable member 2, according to the use in the seat 1.

In fact, by suitably calibrating the maximum length of the tie members 27 in stretched or tensioned condition it is possible to control the shape of the inflatable member 2 in an inflated condition a priori.

Figure 7A:
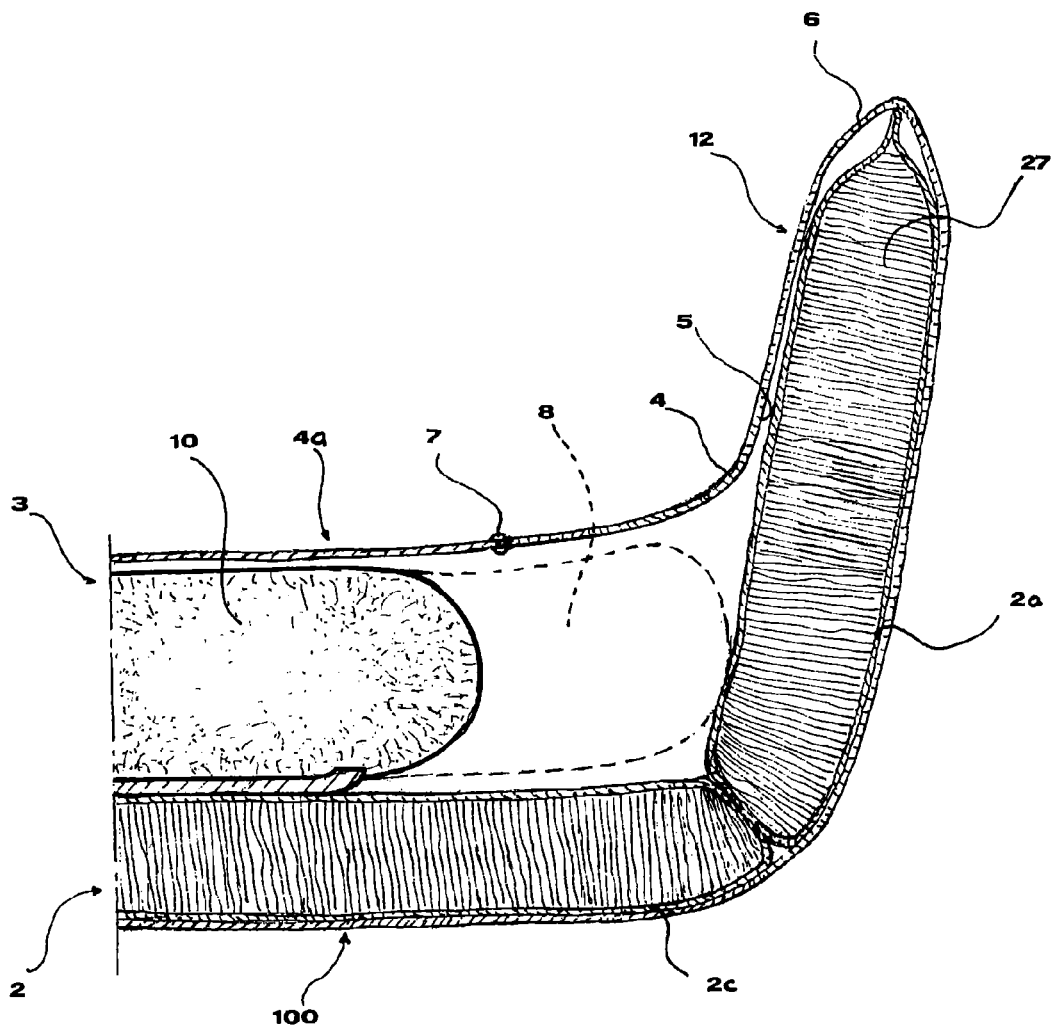
FIG. 7a shows a schematic sectional view, along the line VIIA-VIIA of the covering assembly for a seat of FIG. 2.
Figure 11:
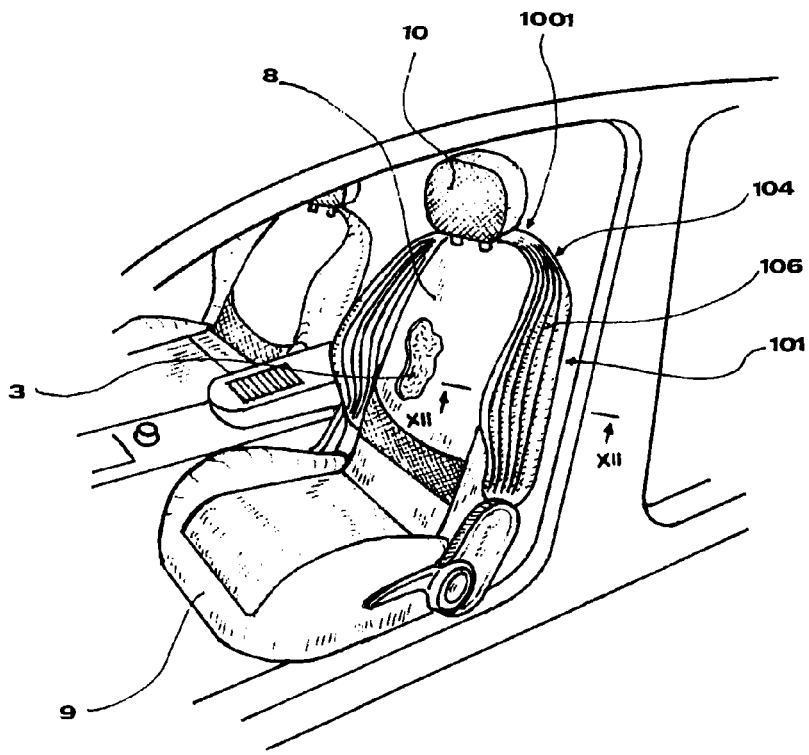
FIG. 11 shows a perspective view of a covering assembly for a seat of the present disclosure, according to a further embodiment, wherein the seat is in a deflated condition.
Figure 12:
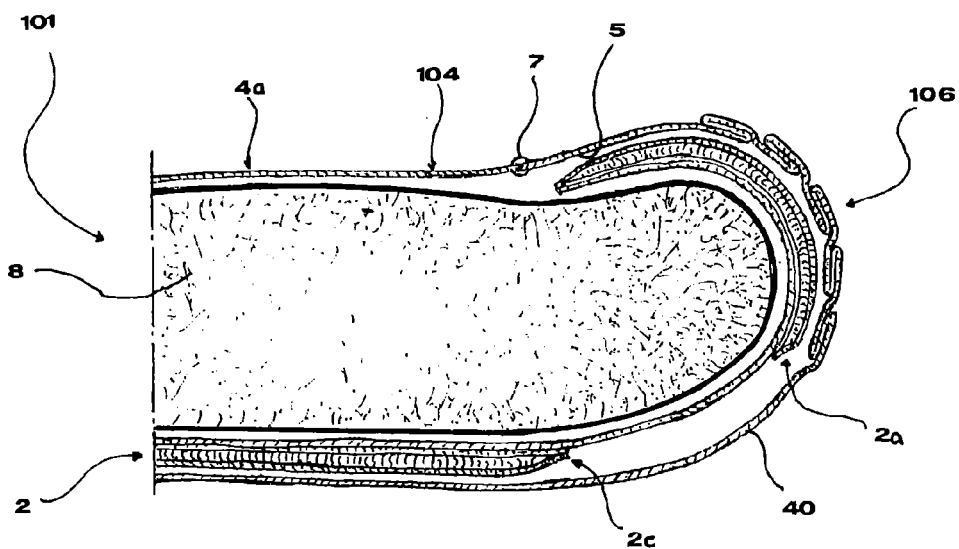
FIG. 12 shows a schematic sectional view, along the line XII-XII of the covering assembly for a seat of FIG. 11.

It should be pointed out, with reference to FIG. 7a, that in order to facilitate the bending P forward of the lateral portions 2a, 2b of the inflatable element 2 in the region of connection zone with the portion 2d, 2e it is possible to provide seams (not visible in the drawings) that connect in direct contact the meshes 29 and 30 in the region of the bending and able to obtain a shrinkage in thickness for the bending P. With reference to FIGS. 11 and 12, it is shown an assembly 1001 for a seat 101 according to a further embodiment.

Members and parts of the present embodiment having the same function and the same structure of the members and parts of the aforedescribed embodiment keep the same reference number and will not be described again.

In particular, the assembly 1001 differs from the preceding embodiment because it includes a portion of cover 104 which, instead of the elastic insert 6 described above, includes a bellows-shaped portion 106.

In particular, the bellows-shaped portion 106 is located in the region of the sides of the backrest 8.

Also in this embodiment, the inflatable member 2 is located in the region of the sides of the seat 101 and of the backrest 8, so as to obtain the same inflating effect shown in FIGS. 2 to 5, and in case also in the region of the sides of the seating 9. In substance, also in this embodiment of the seat 101, when the inflatable member 2 is inflated, the portion of cover 104 is deformed by the expansion force of the inflatable member 2 up to create the lateral barriers 11 and 12, and in case also the barriers 15 and 16; the bellows-shaped portion 106 allows the seat 101 to adapt to a variation in the volume of the inflatable member 2.

Figure 13:
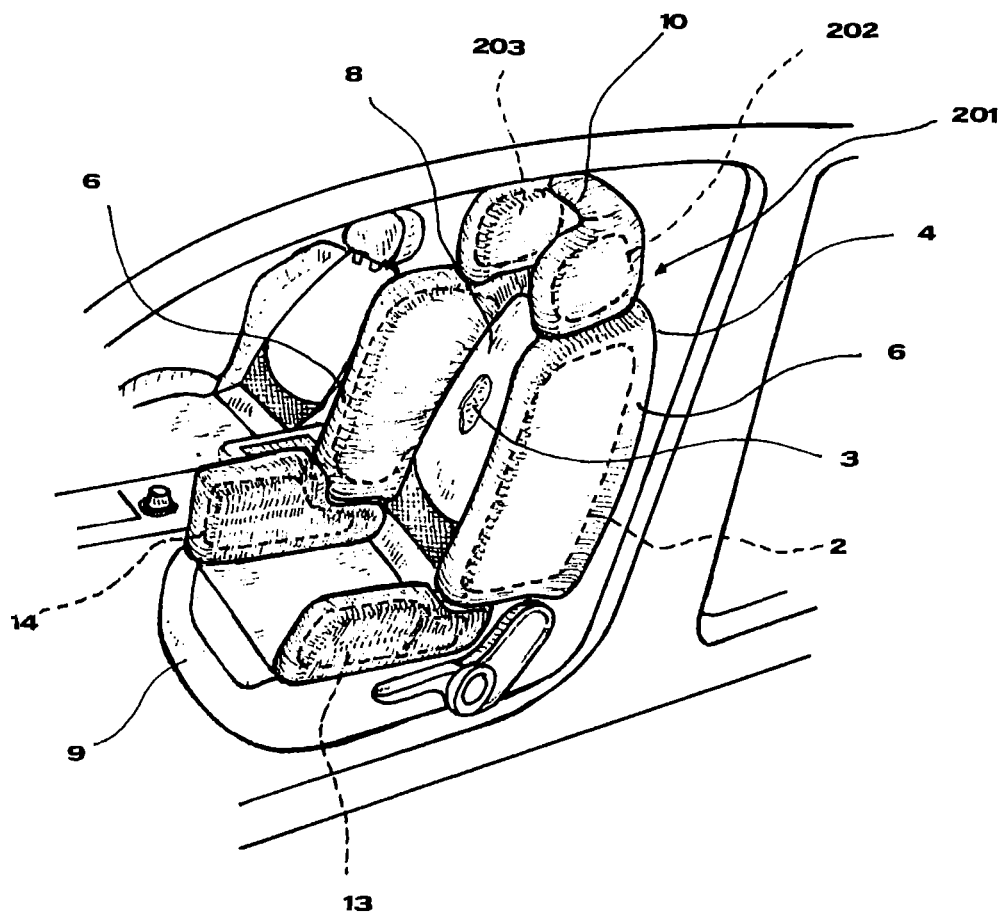
FIG. 13 shows a perspective view of a seat of the present disclosure, according to a further embodiment, wherein the seat is in a inflated condition.

With reference to FIG. 13, it is shown a seat 201 according to a further embodiment.

Members and parts of the present embodiment having the same function and the same structure of the members and parts of the aforedescribed embodiment keep the same reference number and will not be described again.

In particular, the seat 201 includes, as in the previously described first embodiment, a plurality of structurally independent inflatable members (shown with dash-lines in FIG. 13 and denoted with reference numbers 2, 13, 14, 202, 203) and placed respectively at the sides of the backrest 8, at the sides of the seating 9 of the seat 201 and at the sides of an headrest 10.

In the region of these inflatable members 2, 13, 14, 202, 203, the seat 201 includes an elastic insert 6, or alternatively a bellow-shaped portion not shown, to allow a deformation.

The inflatable members 13, 14, 202, 203 have the same structure with threads of the inflatable member 2 previously described.

In an inflated condition, the inflatable members 2, 13, 14, 202, 203, thanks to their flattened and controlled shape, locate easily at the sides of the user, respectively in the region of the user's head, trunk and legs/knees, to protect the user from side impacts.

In substance, the seat 201, in an inflated condition, is adapted to "envelop" the user on all the sides on which there can be a shock.

Figure 15:
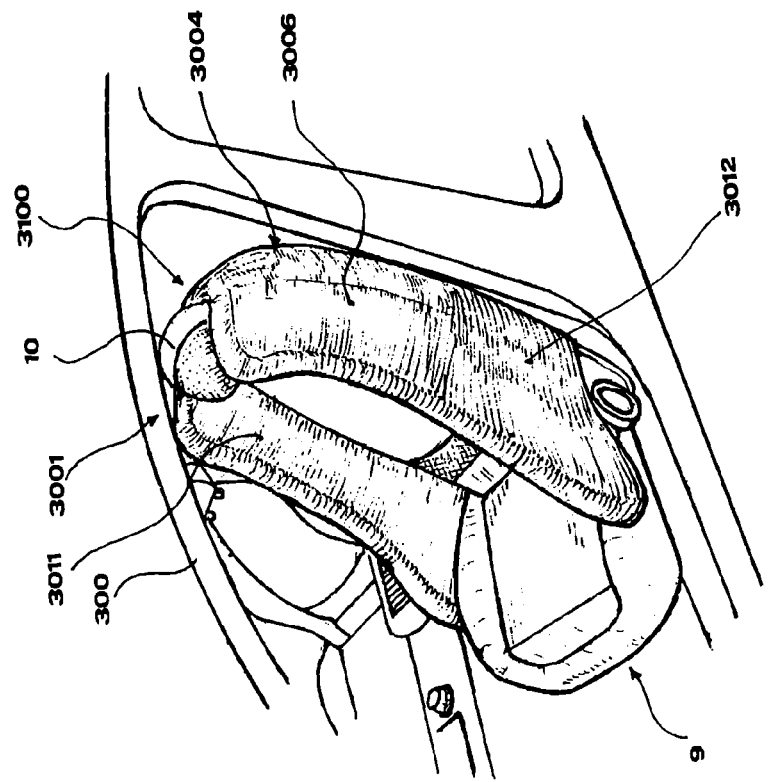
FIG. 15 shows a perspective view of a covering assembly for a seat in a inflated condition, according to a further embodiment.
Figure 14:
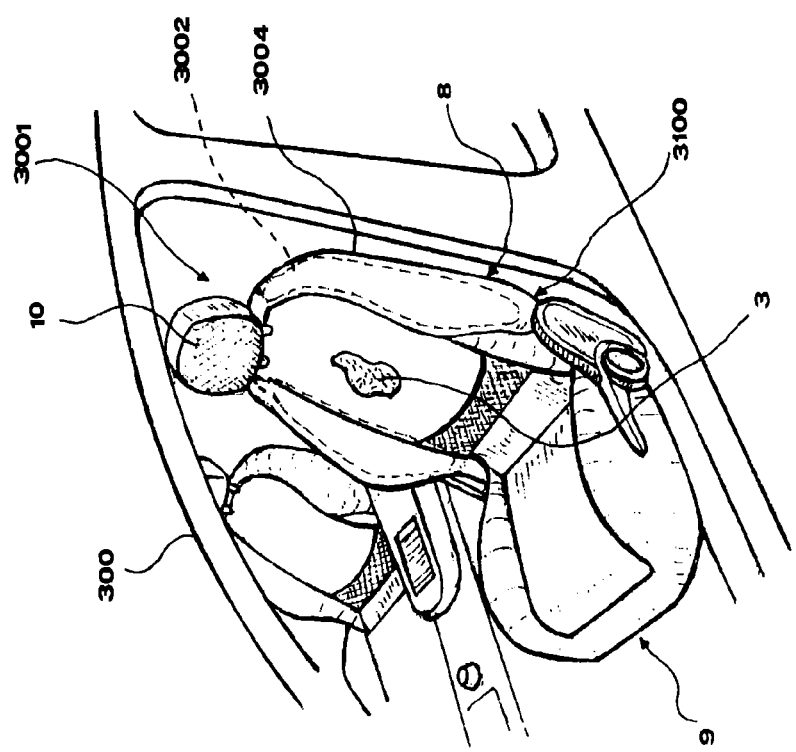
FIG. 14 shows a perspective view of a covering assembly for a seat in a deflated condition, according to a further embodiment.
Figure 16:
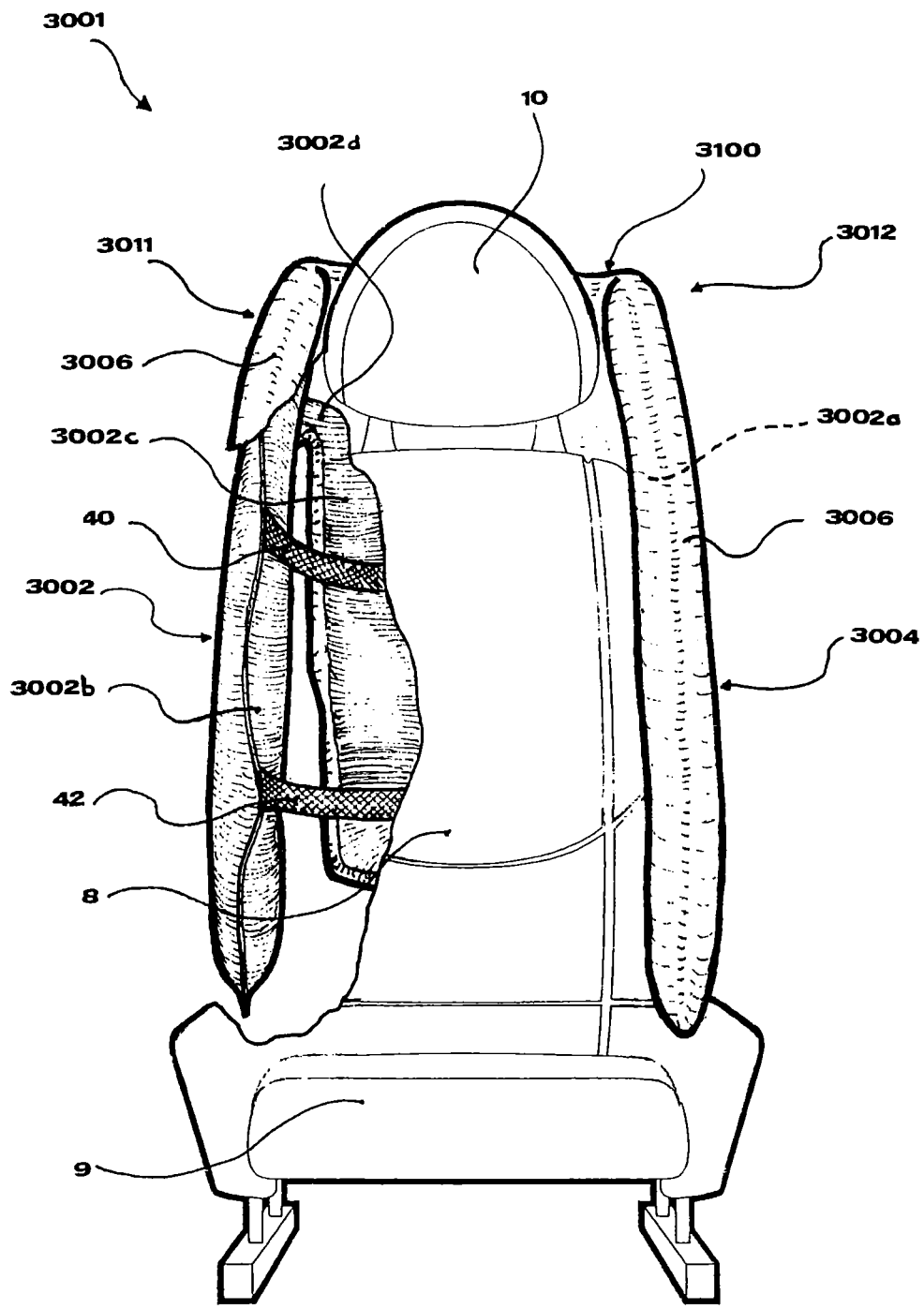
FIG. 16 shows a partially sectional front view of a covering assembly of FIG. 15, in an inflated condition.

With reference to FIGS. 14, 15, 16, it is shown a covering assembly 3100 for a seat 3001 according to a further embodiment.

Members and parts of the present embodiment having the same function and the same structure of the members and parts of the aforedescribed embodiment keep the same reference number and will not be described again.

The covering assembly 3100 includes a cover 3004 that lines or covers the support frame 3 and an inflatable member 3002, located in the regions of the seat 3001 intended to provide protection to a user, wherein the inflatable member 3002 is adapted for being inflated by the introduction of an inflation fluid, e.g. a cold gas, like Helium. In the example it is used a canister 60 connected to the inflatable member 3002.

Also in this embodiment, the cover 3004 covers the inflatable member 3002 both in the deflated condition, and in the inflated condition.

The inflatable member 3002 has the same structure with threads of the inflatable member 2 previously described.

More in particular, in the example shown in FIGS. 14 to 16, the covering assembly 3100 includes an inflatable member 3002 with lateral portions 3002a, 3002b or wings that are located in respective lateral zones or sides of the backrest 8 of the seat 3001, and a rear portion or appendage 3002c that is intended to be placed mantle-like in a respective rear zone of the seat 3001, in particular of the backrest 8. The rear portion 3002c is interposed and connected to the lateral portions 3002a, 3002b in the region of respective top zones, of which only a portion 3002d is visible in FIG. 16, in the region of a top zone or top portion of the support frame 3 of the del seat 3001.

In practice, in the example here described, the inflatable member 3002 is located so as to be able to surround or envelope the support frame 3 and it is shaped so that, once inflated, it causes a deformation of the seat 3001 to build up two lateral barriers 3011 e 3012 (FIG. 16) that project like protuberances at the sides of the backrest 8 to laterally contain any sudden movement of a user, and, at the same time, on the rear side of the backrest 8 for protecting a passenger seating on a rear seat of the car 300.

It should be pointed out that the lateral barriers 3011 e 3012 extend in height at the level of the headrest 10, so as to laterally contain also the head of a user.

Moreover, the lateral barriers 3011 and 3012 protrude forward sufficiently to laterally protect also the seating 9 of the seat thus protecting the legs of the user (i.e. extending to the knees). The forward span of the lateral barriers 3011 and 3012 is chosen according to the type of seat 3001 and of vehicle 300, and avoids the need to provide additional inflatable members for the seating.

In practice, a single inflatable member 3002 is able to laterally contain a user seating on the seat 3001.

Also in this embodiment, the inflatable member 3002 is further provided with two tapes 40, 42 each acting as a traction member.

Moreover, to allow the cover 3004 to adapt to the inflation of the inflatable member 3002, the portion of cover 3004 preferably includes an elastic insert 3006 that extend, as the elastic insert 6 previously described, in the region of the lateral barriers 3011, 3012 up to cover the entire rear side of the backrest 8. The elastic insert 3006 is preferably made of an elastic layer, e.g. nylon combined with an elastomer.

In substance, in this embodiment of the seat 3001, the inflatable member 3002 is shaped so as to build up the lateral barriers 3011 e 3012 and the rear protection of the backrest 8, without the need of barriers located in the seating 9.

Figure 5:
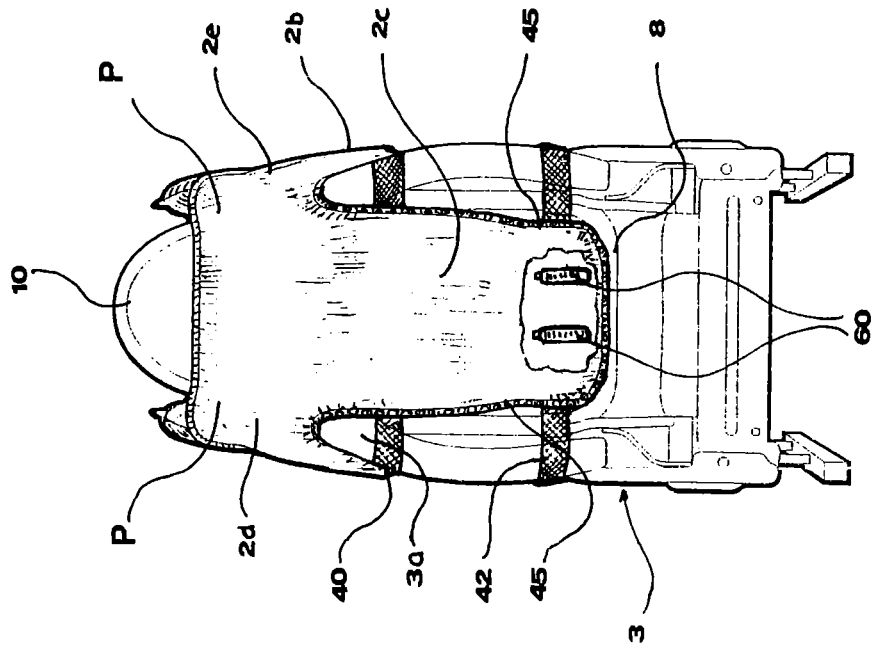
FIG. 5 shows a rear view of an inflatable member associated, in an inflated condition, to a frame of a seat of the present disclosure.
Figure 4:
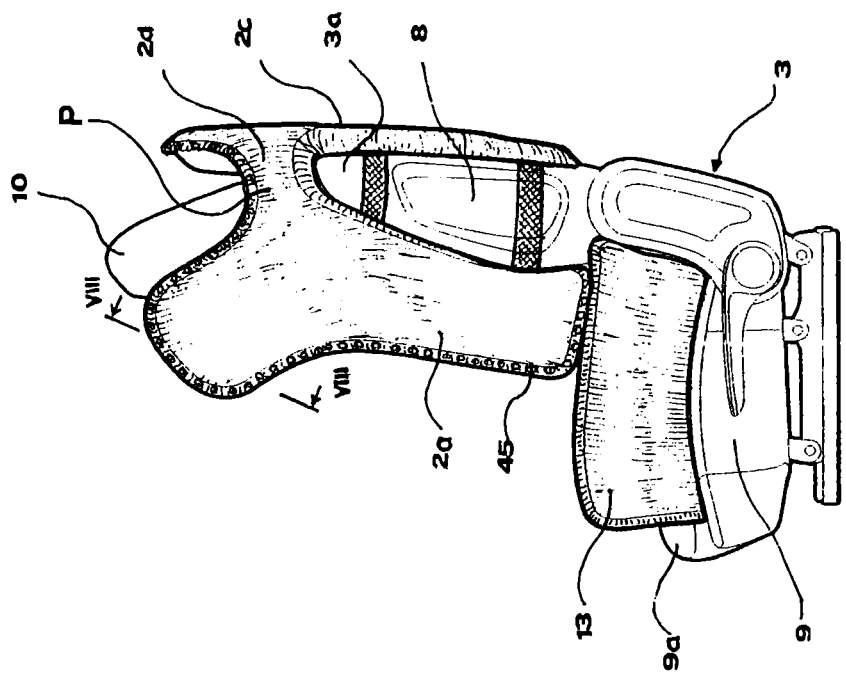
FIG. 4 shows a lateral view of an inflatable member associated, in an inflated condition, to a frame of a seat of the present disclosure.

To carry out the inflation of the inflatable member 2, 13, 14, 202, 203, 3002, in case of an accident and/or an impact by a vehicle 300, the seat 1, 101, 201, 3001 according to the present disclosure is adapted to cooperate with suitable actuating and inflating means, of which in FIG. 5 is illustrated, merely by a way of an example, a canister 60 of Helium (cold gas generator), that is located e.g. inside the inflatable member 2, 13, 14, 202, 203, 3002, or outside the inflatable member 2. Alternatively, such inflating means may comprise generators of pyrotechnic-type or hybrid-type gas, or of gas of other typologies known to the state of the art.

Said inflating means are controlled by a control unit on the basis of a detection of the state of the vehicle, e.g. on the basis of the detection of the state of motion and of the deceleration of the vehicle, and in a manner already used for the activation of airbags known to the state of the art.

It should also be noted that the actuation modes, though being an aspect of particular relevance for an effective operation of the device, will not be further described, as being methods fundamentally already known to a person skilled in the art.

The seat 1, 101, 201, 3001 optionally includes a deflation valve not shown in the drawings, communicating on one side with the internal chamber 25 of the inflatable member 2, 13, 14, 202, 203, 3002 and, on the other side, with the outside environment, in order to allow the deflation of the inflatable member 2, 13, 14, 202, 203, 3002 after actuation, and when a protecting action is not required anymore.

Said deflation valve, which normally is in a closed position, can be manually opened by the user. In fact, the opening of the deflation valve causes gas, due to a pressure difference between the inflatable member 13, 14, 202, 203, 3002 in an inflated condition and the outside environment, to exit from the internal chamber 25 and the inflatable member 13, 14, 202, 203, 3002 to deflate.

As an alternative, the actuation of the deflation valve may be controlled by an electronic control unit (not shown), which opens the deflation valve when a preset time interval (e.g., 15 seconds) has elapsed from actuation of the inflating means.

According to a further embodiment, instead of the deflation valve, it is possible to use a deflation tube, with a diameter calibrated according to the deflation time to achieve.

Controlled deflation is beneficial, for example, to permit to the user to easily exit from the vehicle afterwards an impact, without being clumsy by the seat in an inflated condition.

The subject of the present disclosure has been hereto described with reference to preferred embodiments thereof. It is understood that other embodiments might exist, all falling within the concept of the same invention, and all comprised within the protective scope of the claims hereinafter.

The invention claimed is:

1. A covering assembly for a seat, said covering assembly comprising:
   a cover and an inflatable member adapted to assume a resting deflated condition and an active inflated condition,
   wherein said inflatable member is placed on a side or face of the cover, and
   wherein said cover is adapted to contain the inflatable member both in the resting deflated condition and in the active inflated condition,
   wherein the inflatable member includes at least two side wings,
   the covering assembly further comprising at least one traction member which connects respective portions of the inflatable member and is adapted to keep in a defined mutual position said portions in the active inflated condition, said portions being said side wings.

2. The covering assembly according to claim 1, wherein said cover defines a complete covering for the inflatable member.

3. The covering assembly according to claim 1, wherein said cover is an at least partially extensible cover.

4. The covering assembly according to claim 3, wherein said cover is made of elastic material.

5. The covering assembly according to claim 3, wherein said cover includes an elastic insert.

6. The covering assembly according to claim 3, wherein said cover includes a bellows-shaped portion.

7. The covering assembly according to claim 1, wherein the inflatable member is comprises two tapes, an upper tape and a lower tape, each of the two tapes acting as said at least one traction member,
   the two tapes adapted to be located behind a support frame in a region of a backrest and to connect the at least two side wings of the inflatable member at two different levels, and
   the two tapes adapted to maintain the at least two side wings, in the active inflated condition, substantially aligned and parallel to the sides of the backrest and to avoid any possible undue lateral enlargement of the side wings themselves.

8. The covering assembly according to claim 1, wherein said traction member is an elastic tape.

9. The covering assembly according to claim 1, comprising a first inflatable member adapted to be placed in a region of a first side of a seating of the seat and a second inflatable member adapted to be placed in the region of a second side of the seating of the seat.

10. The covering assembly according to claim 1, wherein said inflatable member includes a plurality of tie members placed inside said inflatable member and stably associated to superficial portions of said inflatable member,
    wherein said tie members are sized so that, when said inflatable member is in the resting deflated condition, said tie members are in a non-tensioned condition and collapsed inside the inflatable member,
    wherein when said inflatable member is in the active inflated condition, said tie members are subjected to tensile stress.

11. The covering assembly according to claim 10, wherein said inflatable member includes:
    a first wall and a second wall fixed one to another along respective perimetral edges to define an internal chamber,
    a textile structure located in said chamber and including a first mesh internally glued at least partially to said first wall, and
    a second mesh internally glued at least partially to said second wall, said tie members having opposite ends fixed respectively to said first mesh and to said second mesh.

12. The covering assembly according to claim 1, wherein said inflatable member is adapted to be inflated in case of an impact.

13. A seat including the covering assembly according to claim 1, wherein said cover is adapted to cover a support frame of the seat.

14. The seat according to claim 13, wherein said seat is a motor vehicle seat.

15. The seat according to claim 13, comprising a backrest, wherein the inflatable member is located at sides of the backrest and wherein, when the inflatable member is in said active inflated condition, the seat has lateral barriers extending toward a front region of the seat.

16. The seat according to claim 15, wherein said seat comprises a seating and protection barriers located at respective sides of said seating.

17. The seat according to claim 15, comprising a headrest and lateral barriers located at sides of a headrest.

18. A vehicle including the seat according to claim 13.

* * * * *